Inventor:
Philip Barkan,
by William Freedman
Attorney.

Nov. 23, 1965 P. BARKAN 3,219,883
ALTERNATING CURRENT DISTRIBUTION SYSTEM
Original Filed March 27, 1961 2 Sheets-Sheet 2
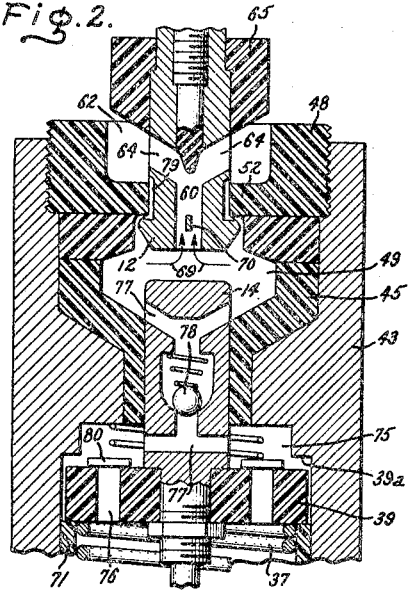
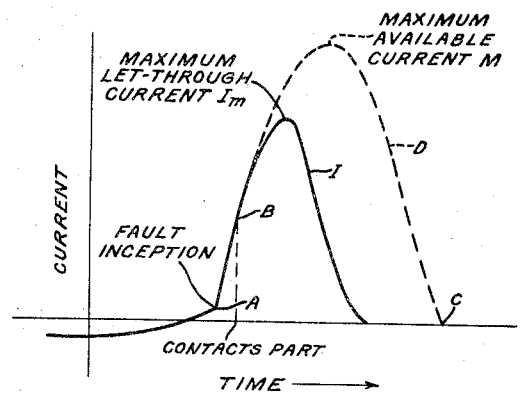
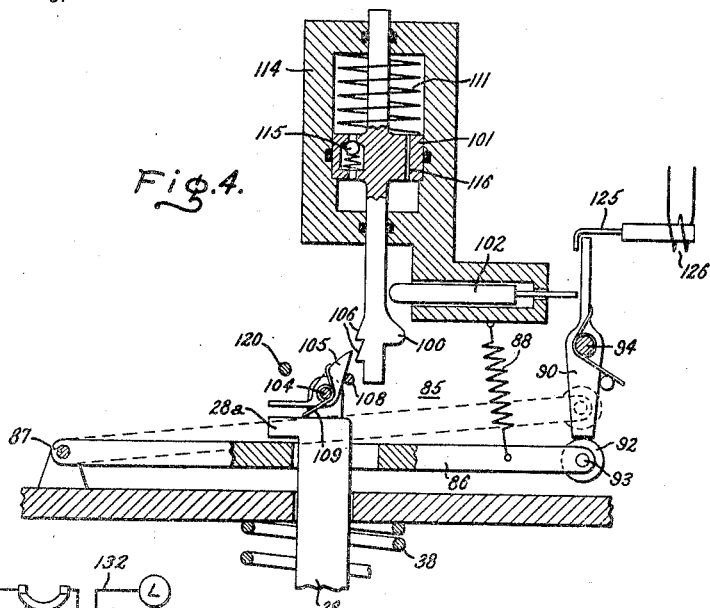
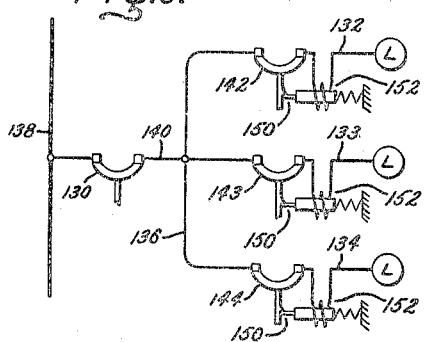
Inventor:
Philip Barkan.
by William Friedman
Attorney.

United States Patent Office 3,219,883
Patented Nov. 23, 1965

3,219,883
ALTERNATING CURRENT DISTRIBUTION SYSTEM
Philip Barkan, Lima, Pa., assignor to General Electric Company, a corporation of New York
Original application Mar. 27, 1961, Ser. No. 98,569, now Patent No. 3,183,331, dated May 11, 1965. Divided and this application Apr. 29, 1964, Ser. No. 363,525
7 Claims. (Cl. 317—25)

This application is a division of my application Ser. No. 98,569, filed March 27, 1961, now Patent No. 3,183,331.

The present application relates to an alternating current distribution system of the type in which: (1) a main circuit breaker controls the flow of current through a plurality of branch circuits that are in parallel with each other and in series with the main circuit breaker, and (2) each branch circuit contains its own normally-closed branch circuit breaker which can be opened to disconnect the associated branch from the remainder of the system.

If a fault should develop involving one of the branches of such a system, it is desirable to isolate this particular branch from the remainder of the system and to continue service over the remainder of the system with a minimum of service interruption due to the fault. This goal can be realized in a selectively coordinated system, but not without its price since such systems require that each of the branch breakers be capable of interrupting the maximum available current of the system. To meet this current-interrupting requirement, each of the branch breakers must be of a rugged and relatively expensive construction.

An object of my invention is to construct the system in such a manner that the above-described objective (i.e., quick isolation of the faulted branch and continued service over the remainder of the system with a minimum of interruption due to the fault) can be attained even though the branch circuit breakers are of an inexpensive construction incapable of interrupting the maximum available current.

In carrying out my invention in one form, I construct the main circuit breaker as a current-limiting circuit breaker that is capable of opening in response to a fault on one of the branches with a current-limiting action that limits the peak current allowed through the breaker to a value substantially below the maximum available value of the system. The branch breaker associated with the faulted branch includes means responsive to the fault current for causing the branch breaker to open within a few cycles after the flow of fault current begins and while the main circuit breaker is open. The main circuit breaker is provided with means for reclosing itself immediately after the branch circuit breaker opens and during a period of between 1 and 6 cycles after initiation of fault current. Reclosing in this extremely short time enables synchronous motor loads to be maintained in operation without any objectionable falling back in phase position of the rotors of the synchronous motors.

For a better understanding of my invention, reference may be had to the following description taken in conjunction with the accompanying drawings, wherein:

FIG. 2 is a cross-sectional view of the circuit breaker of FIG. 1 with the breaker shown in its fully-open position.

FIG. 3 is a graphic representation of certain electrical relationships occurring during the operation of the interrupter of FIGS. 1 and 2.

FIG. 4 is a schematic illustration of counting and lockout mechanism for use with the interrupter of FIGS. 1 and 2.

FIG. 5 is a one line diagram of an electrical distribution system including the circuit breaker of FIGS. 1 and 2.

Figure 1:
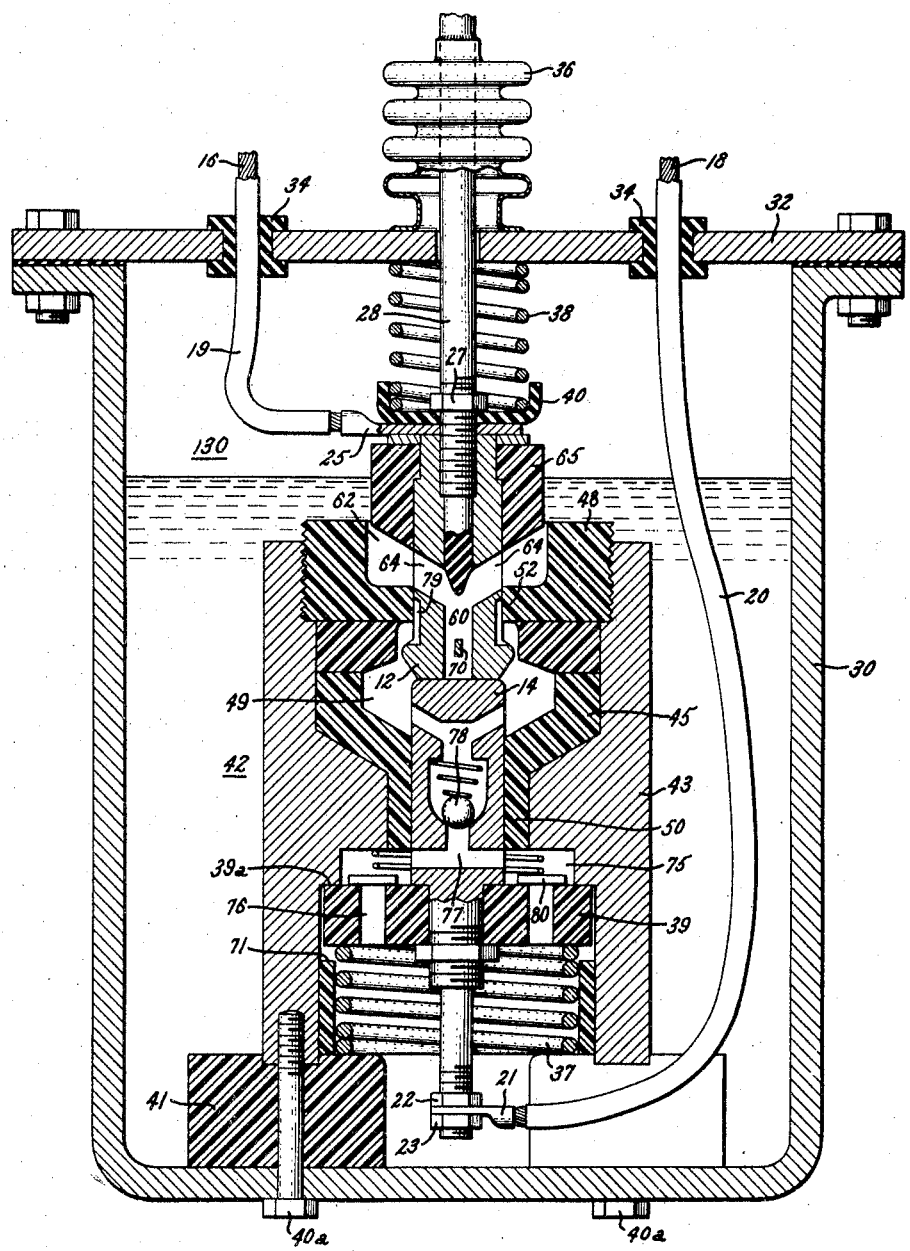
FIG. 1 is a cross-sectional view of a circuit-interrupter forming a portion of a system embodying one form of my invention. The circuit interrupter of FIG. 1 is shown in its closed position.

Referring now to FIG. 1, the circuit breaker 130 shown therein is similar in some respects to a circuit breaker disclosed and claimed in application Ser. No. 97,355, Barkan and Bogert, filed March 21, 1961, now Patent No. 3,183,-330, and assigned to assignee of the present invention. This circuit breaker of FIG. 1 comprises a pair of relatively movable rod-shaped contacts or electrodes 12 and 14 connected across a pair of spaced-apart terminals 16 and 18. The upper rod contact 12 is electrically connected at its upper end to a flexible conductor 19 that provides an electrical connection between one of the terminals 16 and the rod contact 12. The lower rod contact 14 is electrically connected at ts lower end to a flexible conductor 20 that provides an electrical connection between the other terminal 18 and the rod contact 14. Each of the flexible conductors 19 and 20 is shown with a conductive terminal lug suitably secured to its lower end and clamped to one of the contact rods by suitable nuts. For example, the lower terminal lug 21 is shown clamped between a pair of nuts 22, 23 threaded on an extension of the rod contact 14. The upper terminal lug 25 is shown clamped against a shoulder on the upper rod contact 12 by means of a nut 27 threaded on an insulating operating rod 28, which forms a mechanical extension of rod contact 12. It will therefore be apparent that the circuit through the interrupter extends between terminals 16 and 18 via the conductor 19, rod contacts 12 and 14, and the conductor 20.

The circuit breaker further comprises a metallic tank 30 having a cover 32 secured thereto and supporting the terminals 16 and 18. Suitable insulating bushings 34 are provided about the conductors 19 and 20 in the region that they extend through the cover to insulate the conductors from each other and from the cover 32. The insulating operating rod 28 which is secured to rod contact 12, is relied upon for imparting circuit opening movement to the contact 12 under certain conditions soon to be described. This operating rod 28 extends freely through a slide bearing opening in the cover 32 and is surrounded by a flexible bellows 36 that permits the operating rod to be vertically reciprocated without leakage therearound so that the tank 30 can be sealed if desired.

The contacts or electrodes 12 and 14 are of the butt-type and are normally maintained in abutting engagement at their opposed ends by biasing means in the form of a compression spring 38. This compression spring 38 acts between the cover 32 and a shoulder 40 of insulating material clamped to the movable contact 12 for providing a force that urges the contact 12 in a downward closing direction. Opening of the circuit breaker is effected by driving the movable contact 12 in an upward direction away from the other contact 14 against the bias of the closing spring 38.

In a preferred embodiment of my invention, the lower rod contact 14, as well as the upper rod contact 12, is mounted for motion in a direction parallel to its longitudinal axis. The lower contact 14 is normally maintained in its position of FIG. 1 by biasing means in the form of a compression spring 37 disposed beneath a scavenging piston 39 secured to the lower end of the rod contact 14. This spring 37 bears at its upper end on the piston 39 and at its lower end, on a stationary ring 41 secured to the bottom of the tank 30 and, thus, always urges the movable contact 14 in an upward direction. When the circuit breaker is in its closed position of FIG. 1, the position of the lower contact 14 is determined by a stationary shoulder 39a against which the piston 39 abuts and is maintained by the compression spring 37.

For enclosing the arcing gap that is established between the ends of contacts 12 and 14 when the contact 12 is driven upwardly during a circuit opening operation, an arcing chamber 42 suitably fixed to the tank 30, as by insulating screws 40a, is provided. This arcing enclosure 42 comprises a relatively thick-walled outer cylinder 43 made preferably of a high strength non-magnetic metal, such as a non-magnetic steel. Within this outer cylinder 43 is a lining 45 of insulating material, preferably made in several parts to facilitate assembly and manufacture. In the illustrated embodiment of the invention, this lining 45 is shown clamped in place against an internal shoulder on the outer cylinder 43 by means of a heavy insulating nut 48. The nut 48 has external threads that mesh with suitable internal blades formed in the cylinder 43. This composite enclosure 42 defines internally thereof an arcing chamber 49 in which arcing between the contacts takes place during a circuit-interrupting operation. As will soon be pointed out in greater detail, the arcing enclosure 42 serves to confine the high pressure developed in the arcing chamber during arcing. The insulating lining 45 protects the metallic outer cylinder 43 from the arc by preventing the arc from contacting the cylinder 43.

The two rod contacts or electrodes 12 and 14 are slidably mounted within the arcing enclosure 42 by means of suitable slide bearings closely surrounding the rod contacts at locations spaced from their abutting ends. The slide bearing for the lower rod contact 14 is formed in the insulating lining 45 at 50, and the slide bearing for the upper rod contact 12 is formed in the nut 48 at 52. Since the slide bearing 50, 52 and the lining 45 are of electrical insulating material, it will be apparent that these parts serve the additional function of insulating the two contacts from each other and from the metallic cylinder 43 when the contacts are in their separated, or opened, position.

For reacting with the arc to provide the pressures and fluid flow necessary for quick extinction, a suitable arc extinguishing liquid such as oil, water, or carbon tetrachloride is provided. The entire arcing enclosure 42 is submerged in this liquid, and the liquid normally fills the arcing chamber 49 around the abutting ends of the contacts 12 and 14 so as to be available for immediate reaction with the arc.

For directing the flow of arc-extinguishing fluid through the region between the contacts 12 and 14 during interruption, an exhaust passage 60 extending longitudinally of the rod contact 12 is provided. This exhaust passage 60 extends from the arcing chamber 49 to an expansion chamber 62 surrounding the rod contact 12 outside of the arcing chamber 49. Preferably the exhaust passage 60 is provided with a pair of diametrically opposed exhaust ports 64 at its upper end leading to the expansion chamber 62. The walls of the expansion chamber 62 are defined by a recess formed in nut 48 and by a movable piston 65 secured to the contact 12. The recess in the nut 48, in effect, constitutes a cylinder in which the piston 65 is slidable. When the contacts 12 and 14 are in their closed position of FIG. 1, the piston 65 telescopes into the cylinder a short distance so as to block the egress of fluid from the expansion chamber 62 until the piston 65 is moved out of the cylinder. Thus, when the fluid is forced through the exhaust passage 60 into the expansion chamber 62, it exerts an upward contact-opening force on the piston 65. Since the pressurized fluid is prevented from leaving the expansion chamber 62 until the piston 65 is moved upwardly a short distance, it will be apparent that the piston 65, constitutes a restriction to flow through the exhaust passage 60 which accelerates pressure build-up in the arcing chamber 49.

The interrupter as described up to this point is substantially the same as the interrupter described and claimed in the aforementioned Barkan and Bogert application Ser. No. 97,355. As pointed out in the Barkan and Bogert application, this interrupter is capable of interrupting short circuit currents in a conventional 60 cycle alternating current circuit with a "current-limiting" action. That is, the interrupter limits the maximum instantaneous peak value of current which the interrupter permits to flow (maximum let-through current) under short circuit conditions to a value considerably lower than the maximum available current, i.e., the maximum instantaneous peak value of current that would have been carried by the device had it retained its normal closed circuit impedance value. The interrupter accomplishes this current-limiting action by sensing the presence of a short circuit, then opening its contacts in response to the short circuit, and then building up an arc voltage approaching line voltage, all within the extremely short period of about two milliseconds.

For sensing the presence of a short circuit and then initiating contact-separation in response to the short circuit, all within the extremely short time available to produce current-limiting action, the disclosed interrupter relies upon "popping" apart of the contacts. In this regard, there is developed in the abutting regions of the contacts a force dependent upon the magnitude of the current flowing through the contacts, which acts to drive the contacts apart under high current conditions. One component of this force is a magnetic repulsion force between the contacts produced by the current distribution in the abutting regions of the contacts. The other component is a contact-separating force resulting from local heating at the point of contact that produces vaporization that, in turn, produces pressures tending to separate the contacts. These two components of contact-separating force increase sharply as the current increases; and in the disclosed interrupter the sum of these contact-separating force components exceeds the biasing force of the spring 38 at values of short circuit current well within the interrupting rating of the circuit breaker. When this total contact-separating force exceeds the opposing force of the spring 38, the contacts separate or "pop" apart. The sum of these force components tending to drive the contacts apart at a given current is referred to hereinafter as the contact popping force.

Immediately after the contacts separate in response to the above-described popping action, an arc is drawn between the contacts, and this arc immediately vaporizes more surrounding liquid and thus creates additional pressure tending to force the contacts open. The arcing chamber, being essentially imperforate except for the exhaust passage 60, confines this pressure and thus tends to accelerate additional pressure build-up. Not only does this high pressure act directly on the lower end of the movable contact 12 to accelerate the contact toward open position, but it also acts upon piston 65 at the upper end of the contact 12 to provide still additional force for accelerating the movable contact 12 toward open position. In this regard, the high pressures developed within the arcing chamber 49 force fluid through the exhaust passage 60 thus pressurizing the fluid in expansion chamber 62. Since the piston 65 telescopes into the cylinder forming the peripheral wall of the expansion chamber and since there is little clearance between the piston 65 and the cylinder 48, the increased pressure in the expansion chamber is transmitted to the piston 65, thus producing additional force for accelerating the movable contact toward its fully open position.

The piston 65 serves not only as a means for magnifying the contact accelerating force by providing extra area on which the arcing pressure can act, but it serves also to accelerate the pressure build-up within the arcing chamber 49 since it severely restricts the flow of fluid through exhaust passage 60 until the piston emerges from its surrounding cylinder 48. Since this passage 60 is the only significant exhaust passage leading from the otherwise imperforate arcing chamber 49, extremely high pressures are built up within the arcing chamber 49 while the exhaust passage is maintained restricted by the piston. The fact that these pressures are extremely high, e.g., on the order of 500 to 1000 p.s.i. for maximum let-through currents of 50,000 amperes, contributes in an important manner to the high speeds at which contact separation occurs.

It is to be noted, with regard to the interval in which the piston is still within the cylinder 48, that some flow, though limited, is even then taking place through the flow passage 60. Although this limited flow has only a moderate effect in reducing the rate of pressure build-up within the arcing chamber 49, it does serve the important purpose of accelerating arc cooling and in this way accelerating the buildup of arc voltage as will appear more clearly hereinafter.

As the piston 65 emerges from its surrounding cylinder 48, it no longer severely restricts flow through the exhaust passage 60. Accordingly, the high pressure developed in the arcing chamber 49 then becomes free to drive fluid at a much high rate of flow from the arcing chamber 49 through the exhaust passage 60 via the paths indicated by the arrows 69 of FIG. 2. This blast of fluid cuts radially and axially across the arcing region, turbulently mixing with the arc plasma and subjecting the arc to an intense cooling action. This combined mixing and cooling action rapidly builds up an arc voltage that approaches the instantaneous line voltage, and this high arc voltage limits the maximum let-through current to a value considerably lower than the maximum available current. After the current through the breaker has reached its peak, or maximum let-through, value, the arc voltage is able to quickly force the current down toward zero, with the zero current point being reached considerably ahead of the natural current zero. No reignition of the arc occurs thereafter so that interruption is consistently completed by the time the first current zero is reached.

The pattern of flow that results from locating the exhaust passage 60 in it disclosed position, i.e., leading from the arcing gap through the contact 12 in a direction generally parallel to the direction of movement of the contact, is exceptionally effective in producing intense cooling of the arc because the cooling fluid is able to envelope the arc about substantially its entire periphery. In other words, the flow of cooling fluid is radially-inward about substantially the entire periphery of the arcing gap. The fact that the cooling fluid envelopes the arc about its entire periphery is also advantageous from the standpoint of preventing radially-outward expansion of the arcing products and of maintaining the arc centered in the arcing chamber 49 and out of direct contact with the walls of the arcing chamber. This enables us to use a smaller arcing chamber that would be otherwise required without exposing the walls of the chamber to damaging arcing. The smaller this arcing chamber, the more easily it can be made strong enough to safely withstand the high pressures developed during interruption.

The current-limiting action described hereinabove is graphically illustrated in FIG. 3, where the available current is depicted in dotted lines D, and the actual current is depicted in solid lines I. When a fault occurs at a point A, the current flowing through the breaker will increase extremely rapidly toward a maximum available value M, that may be hundreds of times greater than the normal continuous current through the breaker. Due to the contact-popping action described hereinabove, the breaker will part its contacts in response to this sudden rise in current at a point B and will immediately begin developing an arc voltage that limits the actual current to a maximum let-through value Im that is considerably less than the maximum available value M depicted on the dotted line curve. The current is thereafter driven down to zero considerably ahead of the natural current zero occurring at point C.

Actual interrupting tests made with an interrupter corresponding in design to that of FIGS. 1 and 2 have demonstrated that this interrupter can consistently interrupt short-circuit currents with current-limiting action such as depicted in FIG. 3. For example, in a 600 volt alternating-current circuit, the interrupter has interrupted currents having a maximum available value of between 35,000 and 100,000 amperes with such current-limiting action. These figures are given merely by way of example, it being understood that the interrupter can be applied to lower voltage circuits and, with minor modifications, to higher voltage circuits. In the above-mentioned tests made on a 600 volt circuit, only short contact separations, less than ¼ inch, were required to interrupt the circuit with current-limiting action.

For limiting the length of the arc during interruption, a probe 70, preferably of tungsten, is provided in the center of the exhaust passage 60. The above-described blast action that occurs through the exhaust passage 60 during interruption forces the upper terminal of the arc into the exhaust passage and on to the probe 70 where it is maintained during the remainder of the interrupting operation.

During heavy current interruptions, the lower contact 14, as well as the upper contact 12, is moved in a contact-separating direction. In this regard, the pressures generated inside the arcing chamber by a heavy current arc act on the exposed top surface of contact 14 to drive this contact rapidly downward against its biasing spring 38 until the piston 39 engages a stop 71. This downward motion of the lower contact 14 contributes to increased arc lengths, and, hence, increased arc voltages and thus facilitates the current-limiting action of the breaker. This downward motion of the lower contact 14 also plays an important part in the scavenging and reclosing operations that take place immediately after interruption, as will soon appear more clearly.

With regard to reclosing, in certain circuit breaker applications it is desirable to quickly reclose the circuit breaker after an interrupting operation so that the electric service continuity can be maintained in the event that the fault has been cleared or has cleared itself after the interrupting operation. The disclosed circuit breaker is especially suited for such duty inasmuch as the two movable contacts 12 and 14 can return to their closed circuit position under the influence of their respective springs 38 and 37 after the pressure in arcing chamber 49 decays to predetermined values.

The circuit breaker of FIG. 1 is so constructed that the lower contact 14 will return to its position of FIG. 1 before the upper contact returns. This follows primarily from the fact that the lower spring 37 is considerably heavier than the upper spring 38 and is thus able to drive the lower contact into its closed position of FIG. 1 while the pressure in the arcing chamber 49 is still above a value that would allow the upper contact 12 to return.

The disclosed circuit breaker utilizes this upward motion of the lower contact 14 to produce a scavenging action that scavenges the arcing chamber 49 of any gases remaining after interruption. In this connection, when the lower contact 14 moves downwardly during an opening operation, fresh liquid is forced into a scavenging chamber 75 located above the piston 39 through ports 76 extending through the piston. FIG. 2 depicts the parts of the interrupter when the piston 39 has reached its lowermost position and the scavenging chamber has been filled with fresh liquid. When the spring 37 returns piston 39 from its position of FIG. 2 to its upper position of FIG. 1 after interruption, the fresh liquid trapped in the scavenging chamber 75 is positively forced upwardly through a passage 77 extending through the movable contact 14 past a spring-loaded check valve 78 into the arcing chamber. This flow of liquid into the arcing chamber drives any gases remaining therein out of the arcing chamber through the exhaust port 60 and through small bleed opening 79 provided about the upper contact 12. Suitable spring-loaded check valves 80 prevent the scavenging liquid from flowing back through the port 76 during the scavenging operation.

The bleed openings 79 through which gases are forced from the arcing chamber 49 during scavenging are so located that they are opened only at the end of the opening stroke of the upper contact 12, and thus their presence does not detract from the essentially imperforate character of the arcing chamber 49 during the earlier and more critical stages of the interrupting operation. These bleed openings 79 can be quite small inasmuch as they serve primarily for the exhaust of gases rather than liquids. Inasmuch as gases have an extremely low viscosity compared to liquids, an opening small enough to substantially block liquid flow therethrough will allow an appreciable volume of gases to pass therethrough. It is also to be noted that the check valve 78 in the passage 77 blocks any flow out of the arcing chamber and allows flow only into the arcing chamber, and thus its presence does not detract from the essentially imperforate character of the arcing chamber during interruption.

The above-described scavenging action maintains the pressure in the arcing chamber at a high enough level to prevent the upper contact 12 from returning to its fully closed position of FIG. 1 until the lower contact 14 has substantially reached its closed position of FIG. 1. When the lower contact 14 reaches it position of FIG. 1, the scavenging ceases and the pressure in arcing chamber 49 drops sharply, allowing the upper spring 38 to immediately return the upper contact 12 to its closed position of FIG. 1. If the electric fault is then cleared, upper contact 12 will remain in its closed position, thus allowing service to be continued through the then-closed circuit breaker.

If, however, the fault has not cleared when the upper contact 12 returns to its position of FIG. 1, another opening operation, essentially identical to the opening operation described hereinabove, will occur. The above-described scavenging action and the fact that this scavenging action is essentially completed prior to closing of the upper contact 12 are important factors in assuring that no significant quantity of gases will be present in the arcing chamber 49 to interfere with the pressure build-up and flow required to produce current-limiting action on the second interruption.

It will be apparent from the above description of a scavenging and reclosing operation that reclosing of upper contact 12 is blocked until scavenging is substantially completed. Only when scavenging has been substantially completed does the pressure within the arcing chamber 49 decay to a level which permits the spring 38 to reclose contact 12. Minor variations in the time required for scavenging do not impair this highly desirable sequencing since the reclosing means 38 for actuating the upper contact 12 responds to completion of this scavenging action, irrespective of minor variations in the time required for completion. In other words, the reclosing means automatically compensates for minor variations in the time required for scavenging. It will be apparent that this highly desirable sequencing and compensating action are obtained in a simple manner without reliance on any special or complex timers or interlocks.

To aid the scavenging means in maintaining the pressure in the arcing chamber high enough to block reclosing of contact 12 during scavenging, it is desirable that the minimum cross-sectional area of the scavenging passage 77 be relatively large in comparison to the clearance area between piston 65 and cylinder 48. So that a substantial portion of the pressure drop in scavenging fluid flowing through the interrupter occurs in the exhaust area about piston 65. This region of minimum cross-section in the scavenging passage 77 is located in the region of check valve 78.

It will be apparent that my scavenging means 39, 37 derives its operating power from the pressures produced by the interrupting operation since it is these pressures which produce the force for charging spring 37. It is unnecessary to rely upon the closing means 38 of the breaker either for storing energy in the scavenging means or for actually operating the scavenging means. The closing means 38 is thus free to close the circuit breaker at the desired high rate without any impedance from the scavenging means 37, 39.

Another feature of my interrupter is its compactness. Since piston 39 is secured diretly to one of the contacts 14, it is unnecessary to rely upon any special pump separate from the contacts to effect the desired scavenging operation.

If the circuit interrupeter does not remain closed for a predetermined time after one or more reclosures, it is desirable to prevent additional reclosures, i.e., to lock out the circuit interrupter. For performing this lockout function, I provide a lockout mechanism 85 schematically depicted in FIG. 4. This lockout mechanism 85 comprises a lockout lever 86 that is pivotally supported on a stationary pivot 87 and is biased in a counterclockwise direction about the pivot 87 by means of a lockout spring 88. When the circuit breaker is closed, the lockout lever 86 is held in its closed position of FIG. 4 by means of a conventional trip-latch 90. This trip-latch 90 engages a latch roller 92 that is rotatably mounted on the lockout lever 86 at its outer end by means of a shaft 93 fixed to the lockout lever. When the trip latch 90 is rotated in a clockwise direction about its stationary pivot 94, the restraint of latch 90 is removed from the lockout lever 86, and the lockout spring 88 becomes free to drive the lockout lever in a counterclockwise direction toward its dotted line locked-out position. When this occurs, the contact 12 is at or near its fully open position, as will soon be described, and the lockout lever serves to maintain the contact 12 open against its closing spring 38. In this regard, the shoulder 28a on the operating rod 28 is engaged by the lockout lever 86, and the lockout spring 88, being considerably stronger than closing spring 38, acts through this shoulder 28a to apply force to the operating rod 28 greater than the closing force applied by closing spring 38. Thus, the contact 12 is maintained in its open position when the latch 90 is tripped.

The above-described tripping of the trip-latch 90 is effected by means of a suitable cam 100 after the interrupter has opened two times in close succession. This cam 100 is fixed to the rod of a counting piston 101, that is advanced a predetermined distance upwardly in response to each opening operation in a series of closely successive operations. The first of these opening operations advances the cam 100 an insufficient distance to trip the latch 90, but the second of these opening operations advances the cam 100 through an additional increment sufficient to drive the rod 102 to the right to trip the latch 90.

For advancing the counting piston 101 a predetermined distance in response to each of the opening operations in a series of closely successive operations, a pawl 105 is provided pivotally mounted on the operating rod 28. This pawl 105 is biased in a counterclockwise direction about a pivot 104 carried by the operating rod 28 by means of a spring 109. The pawl 105 is adapted to engage ratchet teeth 106 carried by the counting piston 101. A stationary pin 108 normally holds the pawl 105 out of engagement with the ratchet teeth 106, but when the operating rod 28 moves upwardly during an opening operation the pin 108 is no longer capable of holding the pawl out of engagement with the ratchet teeth 106 and the spring 109 forces the pawl clockwise about its pivot 104 into a position to engage the ratchet teeth 106. This enables upward motion of the operating rod 28 and pawl 105 to drive the counting piston 101 upwardly through one step. This motion is transmitted to the counting piston through the upper ratchet tooth 106.

When the operating rod 28 is returned to its closed position immediately after the first opening operation, the counting piston 101 remains in its advanced position temporarily. A suitable reset spring 111 disposed thereabove urges the counting piston 101 to slowly return to its original position. If, however, the movable contact 12 and, hence, operating rod 28 should immediately reopen after closing, the reset spring 111 would not have had an opportunity to produce any significant return movement of the counting piston. No return movement of counting piston 101 having occurred, the pawl 105 would then be in a position to engage the lower one of the ratchet teeth 106 when the operating rod 28 moved upwardly during the second operation. With the pawl 105 in engagement with the lower ratchet tooth 106, the cam 100 would cause the rod 102 to move to the right to trip the latch 90. This would produce lockout of the circuit breaker after the second opening operation in the manner described hereinabove.

The counting piston 101 operates within a liquid filled cylinder 114, but upward motion of the counting piston 101 occurs without significant retardation due to a large passage 115 provided through the counting piston 101. Liquid can flow freely through this passage 115 from top to bottom of the piston during upward motion of the piston 101. This lack of retardation of piston 101 enables the contact 12 to open without significant retardation from the counting device. Return motion of contact 12 also occurs without retardation from the counting device inasmuch as the pawl 105 simply slides over the ratchet teeth 106 during such return motion. Return motion of the counting piston 101 is retarded, however, by virtue of a check valve provided in the passage 115 which blocks the flow of liquid through the passage 115 during downward motion of the counting piston 101. A small metering passage 116 in the counting piston 101 controls this rate of return motion.

If the contact 12 remains closed after the first reclosing operation, the counting piston 101 will slowly reset to its position of FIG. 1. After this resetting has been completed, two closely successive opening operations would be necessary before lockout of the circuit interrupter would occur.

For enabling the counting piston 101 to reset after a lockout operation, a stationary pin 120 is provided for releasing the pawl 105 from the lower ratchet tooth 106 at the end of an opening operation. This pin 120 engages a tail portion of the pawl 105 to pivot the pawl 105 counterclockwise out of driving engagement with the ratchet tooth 106. The reset spring 111 above the counting piston 101 then becomes effective to reset the counting piston 101 to its position of FIG. 4. Accordingly, when the lockout lever 86 is afterwards returned to its solid-line position of FIG. 4 to permit the circuit interrupter to reclose under the influence of its spring 38, the latch 90 is then free to fall in place behind the lockout lever 86. This holds the lockout lever in its position of FIG. 4 when closing force is removed from the lockout lever, thus assuring that the breaker will remain closed if no fault is then present.

For selectively opening the interrupter at any desired instant, a suitable tripping rod 125 coupled to trip latch 90 is provided. This trip rod 125 can be moved to the right either manually or by means of a suitable solenoid 126 to trip the latch 90 and thereby effect opening and lockout of the circuit interrupter.

The disclosed circuit breaker can be used in a wide variety of different circuit applications, but there is one particular application for which it is exceptionally well suited. This application is illustrated in the one-line circuit diagram of FIG. 5, where the circuit breaker of the present invention, designated 130, is shown located at the head of a distribution system including branch circuits 132, 133, and 134 for supplying power to suitable loads L. Each of these branch circuits 132, 133, and 134 is connected to a secondary bus 136 which, in turn, is connected to a main bus 138 through a tie line 140.

The current-limiting circuit breaker 130 of the present invention is connected in the tie line 140, and suitable low capacity circuit breakers, or contactors, 142, 143, and 144 are connected in the branch circuits 132, 133, and 134, respectively. Each of the low capacity branch circuit breakers is of a conventional type that includes suitable current responsive means for automatically opening the branch circuit breaker, i.e., separating its relatively movable contacts, within, say, two cycles after the inception of a fault on the circuit which the breaker protects. By way of example, each of the branch breakers can be suitably biased toward open position and normally held closed by a conventional trip latch 150. The trip latch can be operated in response to overcurrents in a conventional manner, as by a series coil 152 connected in the associated branch, to produce the above-described automatic opening that is relatively slow compared to the opening of main breaker 130. The current-limiting circuit breaker 130, however, is a much quicker acting circuit breaker and is capable of interrupting current flow therethrough within a fraction of a half cycle after the inception of a fault, as was described hereinabove. The current-limiting circuit breaker 130 is also capable of accommodating the maximum available current from the main bus 138 and of limiting the peak current flowing through tie line 140 to a value substantially below the maximum available current.

Assume now that a short circuit develops on branch circuit 132. Current-limiting circuit breaker 130 opens in response to this fault and limits the fault current to a value substantially below the maximum available current. However, during the time (say four milliseconds) required for the current-limiting circuit breaker 130 to interrupt the fault, the trip device of breaker 14 is also energized. This breaker 142 will also open, but in about two cycles after the inception of the short circuit. However, since the current-limiting circuit breaker 130 has already interrupted the tie-line 140, which it did by forcing the let-through current to zero prior to the first natural current zero after fault inception, breaker 142 opens against only the relatively small currents, if any, contributed from the branch circuits 133 and 134. This small current the breaker 142 can readily interrupt, even though it is completely incapable of interrupting current anywhere near the maximum available current from bus 138. After the branch circuit 132 has been thus opened by the branch circuit breaker 142, the current-limiting circuit breaker 130 immediately and automatically recloses (in about three or four cycles after fault inception). This reenergizes the sound branch circuits 133 and 134, and such circuits continue operating normally. Assuming that branch circuit breaker 142 had successfully interrupted the small amount of current flowing therethrough, no further current is supplied to the faulted branch circuit 132 inasmuch as its circuit breaker 142 is then open and isolating circuit 132 from the secondary bus 136.

The minimum reclosing time for the main circuit breaker 130 is dictated by the opening speed of the branch breakers 142–144. In this regard, if the branch breakers can separate their contacts in one cycle after fault inception, then the main circuit breaker 130 can completely reclose in as short a time as 1½ cycles after fault inception. Tests made with circuit breakers similar to that disclosed hereinabove indicate that this breaker can be readily designed to provide reclosing times as short as 1 or 1½ cycles. The maximum reclosing time should be about six cycles in order to lessen to a nonobjectionable extent the falling back in phase position of the rotors of synchronous motor loads.

Had the circuit breaker 142 failed to interrupt the current fed therethrough, the current-limiting circuit breaker 130 would immediately reopen after reclosing and would be locked out in the manner described hereinabove.

It will be apparent that inclusion of the high speed reclosing circuit breaker 130 in the system of FIG. 5 allows the circuit breakers 142, 143, and 144 to be of a much smaller capacity than would otherwise be required since these branch circuit breakers are never called upon to interrupt currents anywhere near the maximum available current, and, as a matter of fact, are not even required to conduct such currents when closed due to the current-limiting action of the main circuit breaker 130. Being able to use branch circuit breakers with greatly reduced interrupting capacity permits these breakers to be of a much less expensive construction.

Had a current-limiting fuse instead of a current-limiting circuit breaker been used in the tie-line 138, it would have been impossible to maintain service continuity over the sound branch circuits due to the inability of a fuse to automatically reclose after a circuit interrupting operation.

It will be obvious to those skilled in the art that various other changes and modifications may be made without departing from my invention in its broader aspects, and I, therefore, intend in the appended claims to cover all such changes and modifications as fall within the true spirit and scope of my invention.

What I claim as new and desire to secure by Letters Patent of the United States is:

1. An alternating current distribution system comprising a main circuit breaker and a plurality of branch circuit breakers connected in parallel with each other and in series with said main circuit breaker, each of said branch circuit breakers comprising relatively movable contacts that are separable to effect opening of the branch circuit breaker; means responsive to the flow of fault current through said main circuit breaker and any one of said branch circuit breakers for causing said main circuit breaker to open with a current-limiting action that limits the peak let-through current to a value substantially below the maximum available value of said system, forces the let-through current to zero substantially before the first natural current zero after fault inception, and prevents further flow of let-through current until a subsequent reclosing; means responsive to said fault current and operable independently of said main circuit breaker for normally causing the branch circuit breaker through which fault current flows to open each time fault current flows therethrough within several cycles after the flow of fault current begins and while said main circuit breaker is open, the contacts of said opening branch circuit breaker separating after the main circuit breaker has forced the let-through current to zero, and means for reclosing said main current breaker immediately after said branch circuit breaker opens and during a period of between 1 and 6 cycles after the initiation of fault current.

2. The alternating current distribution system of claim 1 in which the system frequency is about sixty cycles per second and in which said main circuit breaker develops an arc voltage on the order of magnitude of the instantaneous line voltage within about two milliseconds of the initiation of fault current.

3. The system of claim 1 in combination with means for causing immediate reopening of said main circuit breaker if fault current is flowing through said main circuit breaker when said reclosing is completed, and lockout means responsive to said immediate reopening for preventing additional reclosures of said main circuit breaker following said immediate reopening.

4. The system of claim 3 in which said immediate reopening occurs with a current-limiting action that limits the peak let-through current during said reopening to a value substantially below the maximum available value of said system.

5. An alternating current distribution system comprising a normally-closed main circuit breaker and a plurality of normally-closed branch circuit breakers connected in parallel with each other and in series with said main circuit breaker, each of said branch circuit breakers comprising relatively movable contacts that are separable to effect opening of the branch breaker; means responsive to the flow of fault current through said main circuit breaker and any one of said branch circuit breakers for causing said main circuit breaker to open with a current-limiting action that limits the peak let-through current to a value substantially below the maximum available value of said system, forces the let-through current to zero substantially before the first natural current zero after fault inception, and prevents further flow of let-through current until a subsequent reclosing; means responsive to said fault current for normally causing the branch circuit breaker through which fault current flows to open within several cycles after the flow of fault current begins and while said main circuit breaker is open, the contacts of said opening branch breaker separating after the main circuit breaker has forced the let-through current to zero, and means for reclosing said main current breaker immediately after said branch circuit breaker opens and during a period of between 1 and 6 cycles after the initiation of fault current, said means for causing said one branch circuit breaker to open being operable independently of the operation of said main circuit breaker and without causing opening of the other of said branch circuit breakers.

6. An alternating current distribution system comprising a main circuit breaker and a plurality of branch circuit breakers connected in parallel with each other and in series with said main circuit breaker, each of said branch circuit breakers comprising relatively movable contacts that are separable to effect opening of the branch circuit breaker; means responsive to the flow of fault current through said main circuit breaker and any one of said branch circuit breakers for causing said main circuit breaker to open with a current-limiting action that limits the peak let-through current to a value substantially below the maximum available value of said system, forces the let-through current to zero substantially before the first natural current zero after fault inception, and prevents further flow of let-through current until a subsequent reclosing; means responsive to said fault current and operable independently of said main circuit breaker for normally causing the branch circuit breaker through which fault current flows to open within several cycles after the flow of fault current begins and while said main circuit breaker is open, the contacts of said opening branch breaker separating after the main circuit breaker has forced the let-through current to zero, means for reclosing said main current breaker immediately after said branch circuit breaker opens and during a period of between 1 and 6 cycles after the initiation of fault current, and means for maintaining the other of said branch circuit breakers closed while said main circuit breaker is open, whereby said reclosing of said main circuit breaker results in the maintenance of continued electrical service through said other branch circuit breakers.

7. The circuit breaker of claim 1 in which said main circuit breaker is reclosed within a period of between 1 and 4 cycles after the initiation of fault current.

References Cited by the Examiner
UNITED STATES PATENTS

| | | | |
|---|---|---|---|
| 1,698,292 | 1/1929 | Bany | 317—25 X |
| 2,053,150 | 9/1936 | Keep | 317—25 |
| 2,414,786 | 1/1947 | Lincks et al. | 317—22 |
| 2,499,082 | 2/1950 | Wood | 317—178 |

(Other references on following page)

UNITED STATES PATENTS

| | | | |
|---|---|---|---|
| 2,806,105 | 9/1957 | Wallace et al. | 200—103 X |
| 2,920,251 | 1/1960 | Jacobs et al. | 317—26 |
| 3,127,542 | 3/1964 | Riebs | 317—25 X |
| 3,136,921 | 6/1964 | Dorfman et al. | 317—11 |

FOREIGN PATENTS

| | | |
|---|---|---|
| 598,242 | 9/1959 | Italy. |
| 904,444 | 8/1962 | Great Britain. |

OTHER REFERENCES

French publication article, by Blancipain and Bonnefois, "Protection of Low Voltage Alternating Current Installations With High Performance Limit Switch," extract from Bulletin de la Societe Française des Electriciens, 7th Series, vol. VIII, No. 91, July 1958, 13 pages.

SAMUEL BERNSTEIN, *Primary Examiner.*